United States Patent

[11] 3,624,471

[72] Inventors Leslie G. Japp
Toronto, Ontario;
John F. Phenix, Agincourt, Ontario; Robert Sutherland, Scarborough, Ontario, all of Canada
[21] Appl. No. 30,703
[22] Filed Apr. 22, 1970
[45] Patented Nov. 30, 1971
[73] Assignee A.O. Smith Corporation
Milwaukee, Wis.

[54] APPARATUS FOR PROGRESSIVE PHASE SWITCHING FROM WYE TO DELTA CONNECTION OF THREE-PHASE MOTOR
8 Claims, 6 Drawing Figs.
[52] U.S. Cl. .................................................. 318/225 R, 318/226
[51] Int. Cl. ......................................... H02p 5/28
[50] Field of Search ............................ 318/225, 226

[56] References Cited
UNITED STATES PATENTS
1,467,745 9/1923 Zederbohm ................. 318/226
2,377,726 6/1945 Stapleton .................... 318/226 X Primary Examiner—Gene Z. Rubinson
Attorney—Andrus, Sceales, Starke & Sawall ABSTRACT: A three-phase motor has three phase windings connected in a wye configuration for starting. Contactors are progressively and in timed sequence actuated to connect the wye windings into a delta configuration by varying the winding connection with at least one winding energized at all times. A circuit provides timed switching by selectively opening and then closing related contacts to selectively disconnect and connect one or more windings according to a preselected sequence to the powerlines. The timed switching minimizes current transients and establishes a smooth transition. The control circuit includes an incomplete sequence current-sensing element to disconnect the control circuit and thereby the phase windings in response to a selected excessive or extended intermediate sequence operation.

PATENTED NOV 30 1971

3,624,471

INVENTOR
LESLIE G. JAPP
JOHN F. PHENIX
ROBERT SUTHERLAND
BY
Attorneys 3,624,471

APPARATUS FOR PROGRESSIVE PHASE SWITCHING FROM WYE TO DELTA CONNECTION OF THREE-PHASE MOTOR

BACKGROUND OF THE INVENTION

This invention relates to connecting windings of a three-phase motor to a three-phase power source in wye configuration and selectively and sequentially disconnecting less than all of the windings in timed sequence and intermittently reconnecting such windings in various configurations to produce a final delta running configuration with a smooth transition from the wye to delta configuration.

The well-known method of starting a three-phase motor in wye configuration requires approximately one-third of the current that is required in motors designed for delta connection at their rated voltage. However, motors are preferably run in the delta configuration. Wye starting with subsequent open circuit transition to delta running has not been used extensively because of the current inrush when the circuit is transferred from wye to delta. Thus, if an open circuit condition occurs during the transition, violent line transients of considerable magnitude due primarily to the phase displacement of the induced stator voltage compared to the external line voltage often result.

One method of closed transition employs the placement of a contactor and connecting resistor between each of the three windings to continually supply power through the resistor to the windings during transition. The inclusion of additional contactors and resistors into the motor has made this concept undesirable. U.S. Pat. 1,467,745 to Zederbohm, which was issued Sept. 11, 1923, disclosed another improved method of closed-circuit transition by switching of the center connections of the star or wye windings individually to the outer and inner ends of the other windings to change from a wye to a delta configuration.

SUMMARY OF THE INVENTION

This invention relates to the closed-circuit transition which sequentially connects the windings of a three-phase motor to a three-phase power source and in particular to such a circuit employing individual main power line connecting switch means to each winding as well as internal switch means which are selectively actuated from a control circuit. The control circuit in a particularly satisfactory structure operates various relays and contactors to open and close associated contacts in timed sequence such that the windings are selectively and sequentially disconnected from the wye configuration to intermediate connections and a final delta configuration.

When motor starting is desired, power supplied to the control circuit energizes a contactor to close three contacts and connect one end of each winding to one phase of the external power source. The opposite ends of the windings are connected to each other and the motor starts operation in wye configuration. A time delay contact prevents further switching until the rotor reaches sufficient speed followed by automatic progressive switching of the phase windings from wye to delta configuration.

The contactor and associated contacts are in accordance with a particular novel aspect of this invention of the type having normally open and normally closed poles which function to provide a timed sequence of operation in response to energization thereof. Specifically, an energized contactor with one associated contact having a normally closed pole will cause the normally closed pole to open prior to closing the normally open pole. Proper placement of contacts between the three windings and between the windings and the external power source therefor provides the desired timed switching in a simple and inexpensive manner.

Timing can also be provided through the interaction of various relays whereby one relay closes an associated contact within the control circuit to energize either a second relay or a contactor, the delay occurring due to the mechanical action between the relay and the contacts. Furthermore, relays may employ extended delayed-action contacts to provide specific time delays. Thus, proper selection and arrangement of relays, contactors and associated contacts provide timed sequencing to selectively and sequentially disconnect the windings from a wye configuration to a delta configuration while maintaining current in at least one winding at all times and thereby providing the smooth transition without open circuit conditions.

In another aspect of the present invention, an incomplete sequence-resetting circuit prevents extended operation in an intermediate sequence mode, such as when the windings are neither in a wye nor a delta configuration. If the sequence of switching is not completed within a selected period, the control circuitry responds to disconnect the windings. The starting cycle must then be reinitiated to again connect the windings to the power supply, starting again in the wye configuration.

BRIEF DESCRIPTION OF THE DRAWINGS

The drawing furnished herewith illustrates the best mode presently contemplated by the inventors and clearly discloses the above advantages and features as well as others which will be readily understood from the detailed description thereof. In the drawings.

DESCRIPTION OF THE PREFERRED ILLUSTRATED EMBODIMENT

Figure 1:
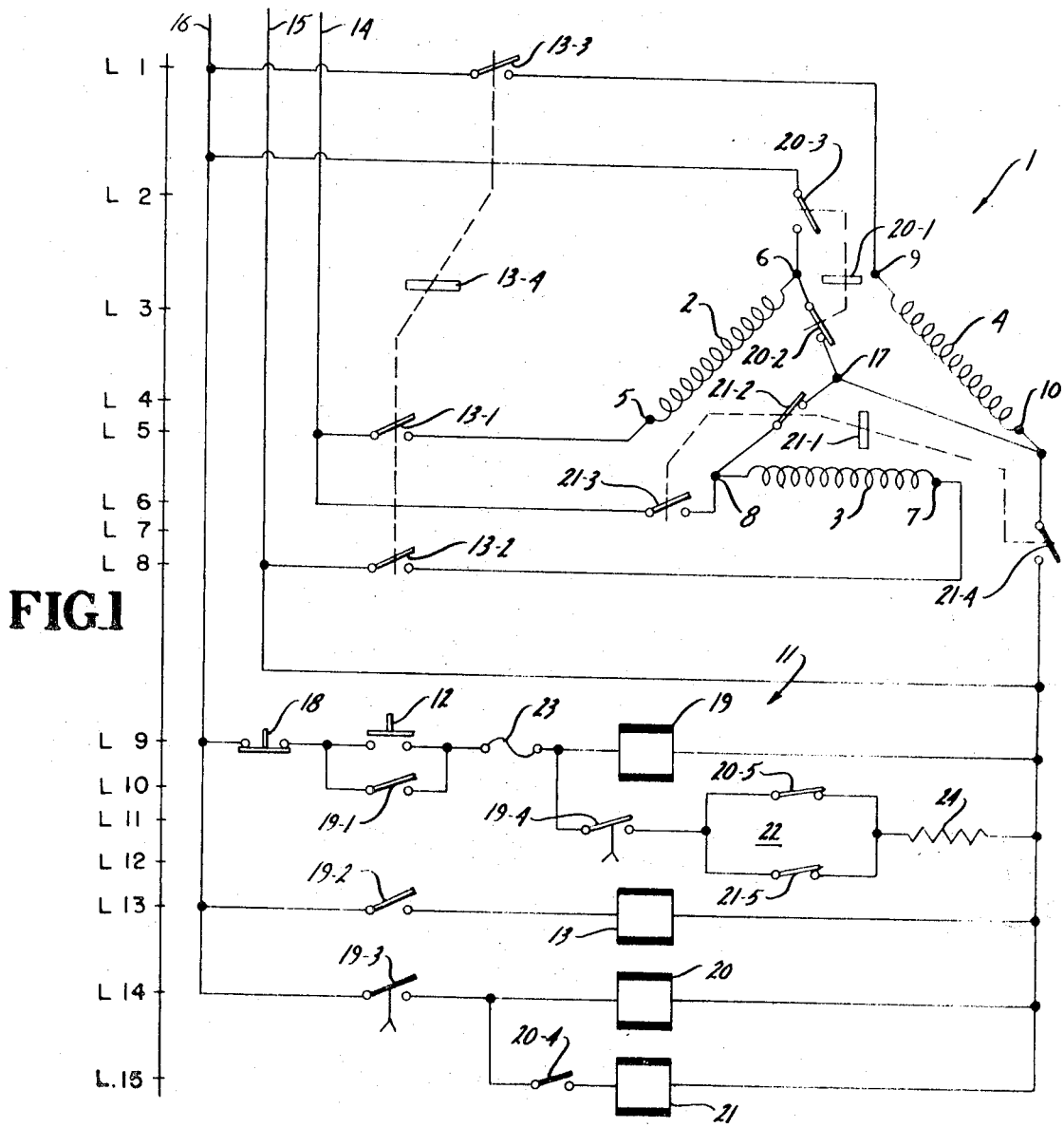
FIG. 1 is a schematic view of a wye-delta, three-phase motor, including a power and switching control circuit.

A preferred construction of the sequence control and motor stator winding connecting circuitry is shown schematically in FIG. 1 for connecting of a three-phase motor 1 in a wye starting circuit and a delta running circuit. The schematic circuit diagram is shown in across-the-line illustration with the several lines provided with identifying numbers distinguished from the element numbers by the prefix L–. Further in the circuit, the several relay and contactors are provided with an identifying legend and all of the related contacts are identified by the corresponding number and a following subnumber.

The three-phase electric motor 1 includes three stator windings 2, 3, and 4 associated with a stator structure and rotors, not shown. The opposite ends of windings 2–4 are selectively energized at points 5, 6, 7, 8, 9 and 10 from a suitable external three-phase power source, not shown. A control circuit 11 selects and connects the windings 2, 3 and 4 and particularly points 5–10 to the external power source. In the illustrated embodiment, a pushbutton start switch 12 at L–9 connects the start branch or line of the control circuit 11 across a phase of the three-phase power source. Switch 12 could be remotely or automatically controlled, for example, as contacts of a relay controlled from an external source to allow incorporation into a larger automated control system. One end of the phase windings 2, 3 and 4 is connected to the respective powerlines 14, 15 and 16 in series with normally open contacts 13–1, 13–2 and 13–3, respectively, of contactor 13, which is connected across powerlines 15 and 16 at line L–13. The normally open contacts 13–1, 13–2 and 13–3 close in response to energization of contactor 13 and again open when contactor 13 is deenergized. Specifically, energization of contactor 13 causes as associated common armature 13–4, shown at L–3, to respond to the magnetic influence exerted upon it by the contactor coil, thereby moving the interconnected normally opened contacts 13–1 at L–5, 13–2 at L–7, and 13–3 at L–1 into a closed position to supply power to the corresponding ends of windings 2, 3 and 4, respectively. The opposite ends of windings 2–4 and particularly points 6, 8 and 10 are connected in common as at 17, to define an electrical wye or star configuration of the three-phase windings, as diagrammatically shown in FIG. 2. Switch 12 is connected in series with a stop switch 18 and a control relay 19 to lines 15 and 16.

Switch 18 at L-9 is shown as a normally closed, manually operable pushbutton switch unit. The switch 18 may also comprise an electrically operated switch. The opening of switch 18 disconnects the branch of control circuit 11 from the power source, deenergizing relay 19 and thereby contactor 13 to release armature 13-4 and thereby open the associated contacts 13-1 through 13-3 which disconnects windings 2, 3 and 4 from external powerlines 14, 15 and 16, respectively.

Figure 2:
FIGS. 2-6 are diagrammatic views illustrating the phase-sequencing windings connection relative to the embodiment of FIG. 1.
Figure 6:
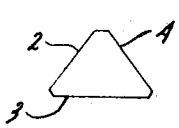

Operation of three-phase motor 1 in wye phase configuration when starting, demands approximately one-third of the current that is required in rated voltage delta operation while correspondingly producing only one-third of the torque. It is therefore desirable to switch the windings from a wye phase configuration, as illustrated in FIG. 2, to a delta phase configuration, as illustrated in FIG. 6, when the rotor has reached sufficient operating speed. In order to reduce current line transients to minimal and ineffectual values when switching from wye to delta configuration, windings 2, 3 and 4 are removed from wye and reconnected intermittently in various configuration with the final delta in timed sequence.

The sequential switching cycle begins when relay 19 is energized which, in turn, closes normally open contact 19-2 to energize contactor 13 and connect windings 2, 3 and 4 to external powerlines 14, 15 and 16 as previously explained. Energized relay 19 further closes normally open sealing contact 19-1 shown at L-10 to seal relay 19 into circuit independently of start switch 12. Relay 19 also has associated normally open contact 19-3 connected in the control circuit at L-4 to control power supplied to contactor 20. Contact 19-3 delays in closing through a pneumatic timing element associated with the contact until the rotor of three-phase motor 1 reaches normal operating speed.

Figure 3:
Figure 4:

The closing of contact 19-3 energizes contactor 20 to remove winding 2, corresponding to phase I, from the wye configuration and establish the circuit of FIG. 3 and immediately reconnect the same winding 2 in a delta phase connection directly across external powerlines 14 and 16, as illustrated in FIG. 4. Specifically, contactor 20 at L-14 energizes when contact 19-3 closes, causing associated armature 20-1 to move in accordance with the magnetic influence exerted upon it. As armature 20-1 begins moving, normally closed contact 20-2 at L-3 will first open to disconnect winding 2 from center point 17 and from the wye configuration to establish the configuration illustrated in FIG. 3. Armature 20-1 continues to move, and after a selected greater distance, closes normally open contact 20-3 at L-2 to connect point 6 of winding 2 to external powerline 16. The difference in distance that armature 20-1 must move between opening contact 20-2 and closing contact 20-3 provides a desirable small time delay between the disconnecting and reconnecting of winding 2 from the wye to delta connection.

Armature 20-1 at the end of the time delay also closes contact 20-4 at L-15 to initiate the next sequence of switching.

Figure 5:
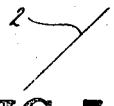

Closing of contact 20-4 energizes a contactor 21 to remove phases II and III, corresponding to windings 3 and 4, respectively, from the wye connection or configuration, as illustrated in FIG. 5, and later to reconnect the same windings in the final delta configuration, as illustrated in FIG. 6. Specifically, contactor 21 at L-15 energizes when contact 20-4 closes, causing an associated armature 21-1 to move in accordance with the magnetic influence exerted upon it. As armature 21-1 begins to move, associated contact 21-2 at L-4 opens to disconnect intermediate series connection of windings 3 and 4 and thereby open the previous series circuit from external powerlines 15 and 16, respectively. This leaves winding 2 connected directly across lines 14 and 16 to establish the circuit illustrated in FIG. 5. After a delay associated with further movement of armature 21-1, as explained above in relation to armature 20-1, normally open contacts 21-3 and 21-4 at lines L-6 and L-7, respectively, close to connect the opposite ends of windings 3 and 4 to the external powerlines 14 and 15, as illustrated in FIGS. 1 and 6. All three windings 2-4 are now connected in delta configuration and the three-phase motor 1 operates in the desired running connection.

In order to insure that the delta configuration, as illustrated in FIG. 6, is obtained for normal operation, an incomplete sequence stop circuit 22 is shown in control circuit 11 to initiate disconnection of windings 2, 3 and 4 from external powerlines 14, 15 and 16 whenever switching is not completed within a predetermined period. Specifically, when pushbutton switch 12 energizes relay 19, contact 19-4 shown at L-11 closes after a time delay to complete a parallel circuit with relay 19 connected in series with a fuse 23, contact 19-1, and manual switch 18. When contact 19-4 closes, the additional current of the paralleled circuit flows through fuse 23 into closed contact 19-4, parallel connected normally closed contacts 20-5 of contactor 20 and contacts 21-5 of contactor 21 and a resistor 24. If phase switching is completed within a predetermined time, contacts 20-5 and 21-5 will open and current flowing through fuse 23 supplied to sequence stop circuit 22 will cease and normal operation will continue. However, if either contacts 20-5 and 21-5 do not open for any reason, indicating incomplete phase switching, current through sequence stop circuit 22 will continue and the increased current flowing through fuse 23 for a predesigned time will cause the fuse to melt to disconnect control circuit 11 from the power supply ceasing all operation.

The preferred embodiment also contemplates the use of a control circuit transformer with associated fusing to operate control circuit 11 at reduced voltage levels. The circuit may, of course, employ suitable reverse phase-sensing relays, phase-failure-sensing relays, antirecycle-sensing relays, overload relays, or the like, to increase utility and efficiency of operation.

The present invention provides a highly satisfactory and reliable control for starting a three-phase motor in wye configuration and selectively switching the windings to delta configuration in timed sequence to provide a smooth transition.

Various modes of carrying out the invention are contemplated as being within the scope of the following claims, particularly pointing out and distinctly claiming the subject matter which is regarded as the invention.

We claim:

1. A motor-starting apparatus for sequentially switching between a wye and delta operation in timed sequence, comprising a three-phase power source, first, second and third phase windings each having first and second ends, a first switching means for connecting said first ends of said first, second and third phase windings to said power source, a second switching means for selectively connecting said second ends of said first, second and third phase windings to each other and to said power source, and control means connected to said first and second switching means for initially actuating said first switching means to energize said first, second and third phase windings in wye starting operation and subsequently actuating said second switching means to sequentially disconnect said second ends from each other and sequentially reconnect to said power source while continually connecting said first ends to said power source through said first switch means and energizing at least one of said phase windings for effectuating a smooth transition to energize said first, second and third phase windings in delta running operation.

2. The apparatus of claim 1, and including a center point selectively connected to said second ends of said first, second and third phase windings by said second switching means, said second switching means including a first contactor having first normally closed contacts and second normally open contacts and a second contactor having third normally closed contacts, fourth normally open contacts, and fifth normally open contacts, said first and third normally closed contacts connecting said second ends to said center point in response to the deactivation of said first and second contactors while said second, fourth and fifth normally open contacts connecting said second ends to said power source in response to the activation of said first and second contactors.

3. The apparatus of claim 2, wherein said control means includes a first energizing means connected for actuating said first switching means, a second energizing means connected for actuating said first contactor, and a third energizing means connected for said second contactor, said control means actuating said first, second and third energizing means in sequence to ensure proper sequentially opening and closing of said contacts.

4. The apparatus of claim 2, wherein said first normally closed contacts open a preselected time before said second normally open contacts close in response to activation of said first contactor and said third normally closed contacts open a preselected time before said fourth and fifth normally open contacts close in response to activation of said second contactor.

5. The apparatus of claim 3, wherein said control means includes a control relay selectively connected to be energized by said power source having a sixth normally open set of contacts for selectively energizing said first switching means, and
an incomplete sequence stop means connected for deenergizing said control relay in timed response to the energization of said control relay and the deenergization of said third energizing means to reset said control means and disconnect said first, second and third phase windings from said power source.

6. The apparatus of claim 3, wherein said incomplete sequence stop means includes a current-sensitive fuse serially connected to said control relay, a seventh set of normally opened contacts electrically operated by said control relay and serially connected to an eighth set of normally closed contacts electrically operated by said third energizing means, said seventh and eighth set of contacts serially connected to said fuse.

7. An apparatus for sequentially connecting three windings of a three-phase motor to a three-phase power source, comprising,
a first electrically operated contactor having a plurality of contacts,
a second electrically operated contactor having a plurality of contacts,
a third electrically operated contactor having a plurality of contacts,
a first winding connected to a first phase line of said power source through first normally open contacts of the first electrically operated contactor, the opposite end of said first winding connected conjointly to a third phase line of said power source through normally open contacts of the second electrically operated contactor and to a center point through the normally closed contacts of said second electrically operated contactor;
a second winding connected to a second phase line of said power source through second normally open contacts of said first electrically operated contactor, the opposite end of said second winding connected conjointly to said first phase of said power source through first normally open contacts of the third electrically operated contactor and to said center point through normally closed contacts of said third electrically operated contactor;
a third winding connected to said third phase line of said power source through third normally open contacts of said first electrically operated contactor, the opposite end of said third winding connected conjointly to said second phase of said power source through second normally open contacts of said third electrically operated contactor and directly to said center point electrically connecting said three windings; and
a control means connected for actuating said first contactor to supply power to said first, second and third windings and for sequentially activating said second and third contactors to time control the opening and closing of the contacts associated with said second and third electrically operated contactors to continually connect said windings to said power source and energize at least one of said three windings when detaching said three windings from wye configuration and connecting said three windings in delta configuration.

8. The apparatus of claim 7, wherein said contactors similarly open the normally closed contacts a preselected time before closing of the corresponding normally open contacts, and said control means includes means to energize said first, second, and third contactors in a corresponding sequence with the time between successive energization of the second and third contactor being sufficiently long to establish complete opening and closing of the contacts of the preceding contactor.

* * * * *

UNITED STATES PATENT OFFICE
CERTIFICATE OF CORRECTION

Patent No. 3,624,471    Dated Nov. 30, 1971

Inventor(s) Leslie G. Japp, John F. Phenix, Robert Sutherland

It is certified that error appears in the above-identified patent and that said Letters Patent are hereby corrected as shown below:

Column 1, line 65,    After "normally" insert ---open pole and another associated contact having a normally"

Column 3, line 28,    Cancel "L-4" and substitute therefor ---L-14---

Signed and sealed this 23rd day of May 1972.

(SEAL)
Attest:

EDWARD M. FLETCHER, JR.    ROBERT GOTTSCHALK
Attesting Officer          Commissioner of Patents